United States Patent [19]

Lanius

[11] Patent Number: 4,739,577
[45] Date of Patent: Apr. 26, 1988

[54] TACKLE BOX

[75] Inventor: Charles A. Lanius, Pairie du Sac, Wis.

[73] Assignee: Flambeau Corporation, Baraboo, Wis.

[21] Appl. No.: 37,688

[22] Filed: Apr. 13, 1987

[51] Int. Cl.[4] .................. A01K 97/00; A47B 51/00
[52] U.S. Cl. .................................. 43/54.1; 43/57.1; 312/266; 312/DIG. 33
[58] Field of Search ........................ 43/54.1, 57.1; 206/315.11, 349, 372; 224/920; 312/DIG. 33, 266, 281

[56] References Cited

U.S. PATENT DOCUMENTS

| | | |
|---|---|---|
| 1,497,377 | 6/1924 | Lucas, Jr. . |
| 1,674,352 | 6/1928 | Adams . |
| 2,316,833 | 4/1943 | Baron ................... 43/57.1 |
| 2,711,050 | 6/1955 | McIntyre . |
| 2,889,658 | 6/1959 | Shanks . |
| 3,350,810 | 11/1967 | Warner et al. . |
| 3,367,062 | 2/1968 | Glass ..................... 43/57.1 |
| 3,543,432 | 12/1970 | Gates ..................... 43/54.1 |
| 3,606,511 | 9/1971 | Henning et al. .......... 312/266 |
| 3,639,021 | 2/1972 | Fee . |
| 3,668,802 | 6/1972 | Benward ................. 43/57.1 |
| 3,758,977 | 9/1973 | Miller . |
| 3,769,741 | 11/1973 | Bucklin . |
| 3,880,485 | 4/1975 | Schmelzer . |
| 3,985,409 | 10/1976 | Kneier ............... 312/DIG. 33 X |
| 4,006,553 | 2/1977 | Porter et al. . |
| 4,067,422 | 1/1978 | Eberle . |
| 4,084,865 | 4/1978 | Joyce ............... 312/DIG. 33 X |
| 4,128,170 | 12/1978 | Elliott . |
| 4,245,422 | 1/1981 | Souza . |
| 4,353,182 | 10/1982 | Junkas . |
| 4,500,059 | 2/1985 | Papizan . |

Primary Examiner—Nicholas P. Godici
Assistant Examiner—Carmine Cuda
Attorney, Agent, or Firm—Allegretti, Newitt, Witcoff & McAndrews, Ltd.

[57] ABSTRACT

A molded plastic tackle box is adapted for use by fishermen to store and transport items of tackle, bait, fishing accessories and other equipment. The box has a selectively movable storage deck adapted to temporarily and safely hold a limited number of such items. The storage deck may be mounted in the box during normal usage and transportation of the box. However while fishing, the storage deck may be mounted outside of the box on the side wall of the box. When the deck is so mounted, the lid of the box may be closed so as to prevent rain water and other casual water from getting into the box and to preclude the spillage of the contents of the box if it would happened to be bumped or tipped over.

10 Claims, 3 Drawing Sheets

U.S. Patent  Apr. 26, 1988  Sheet 1 of 3  4,739,577
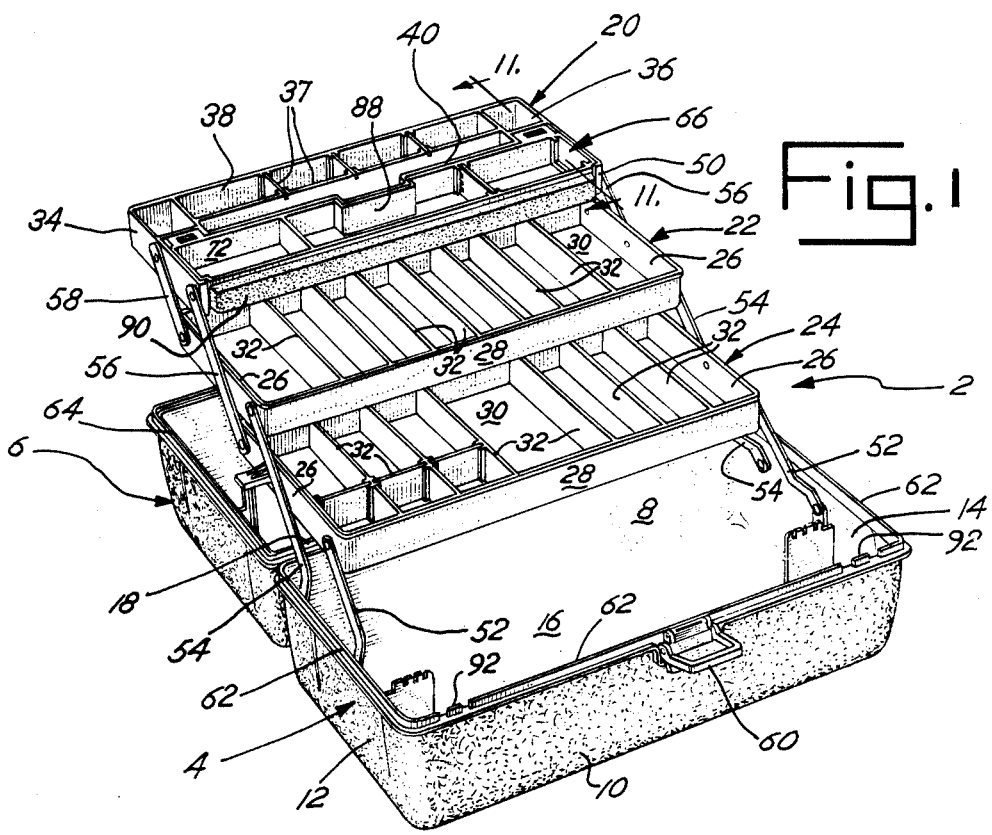
Fig. 1
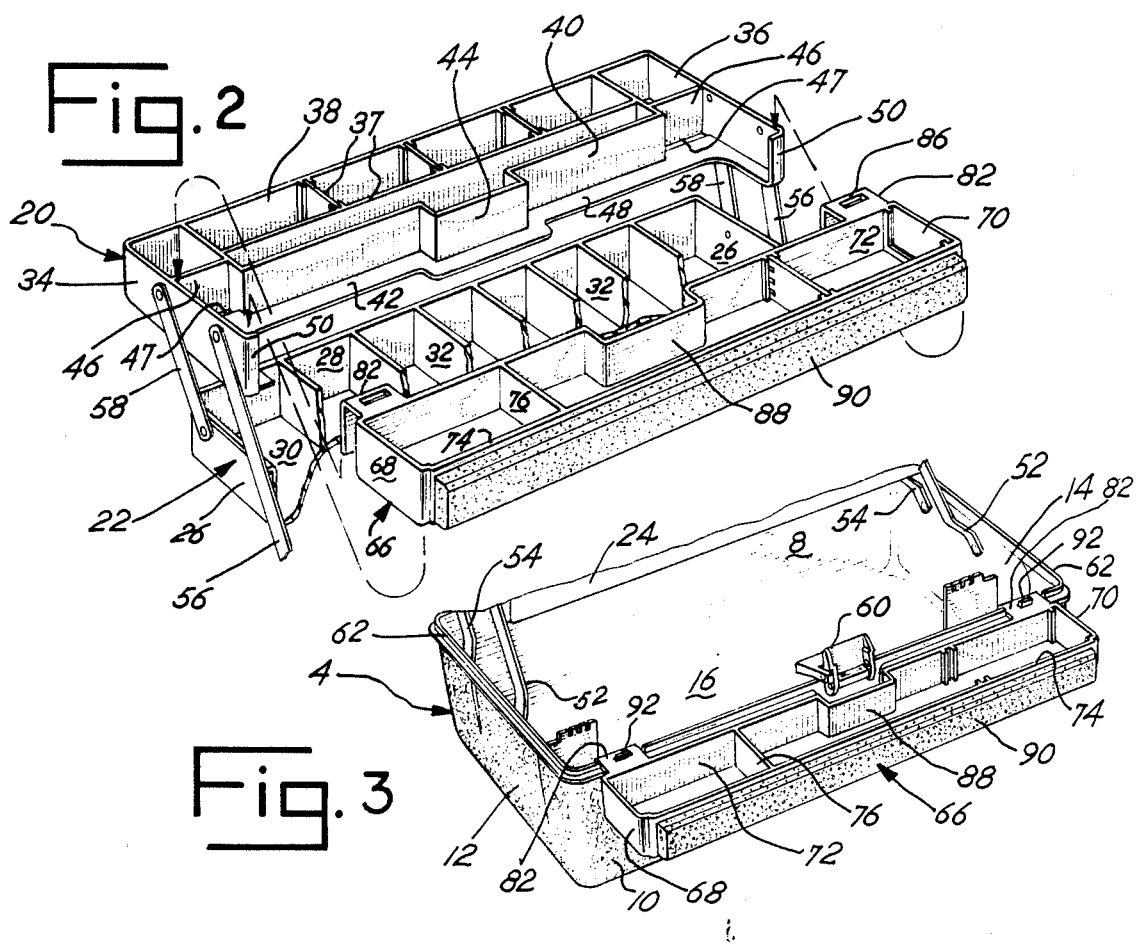
Fig. 2
Fig. 3

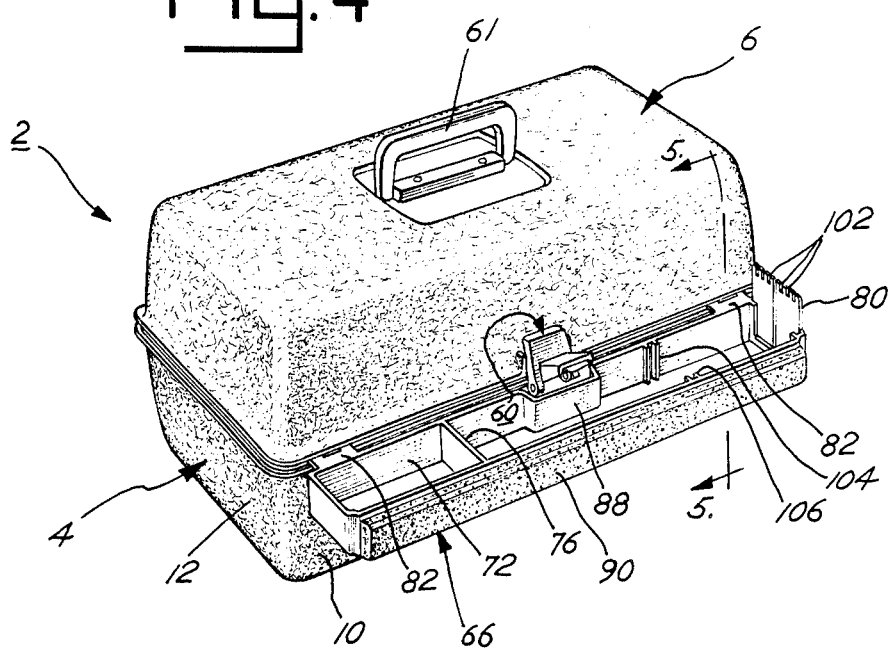
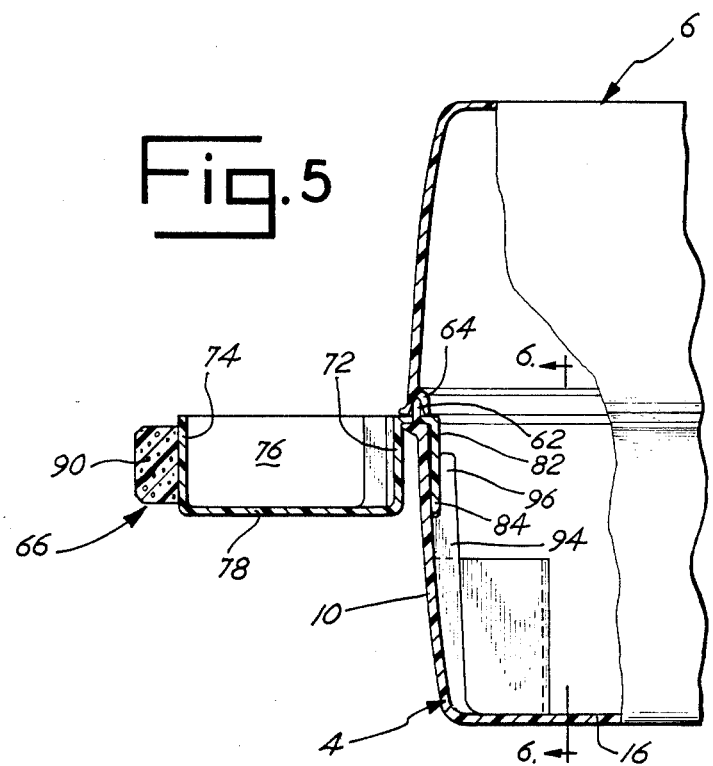
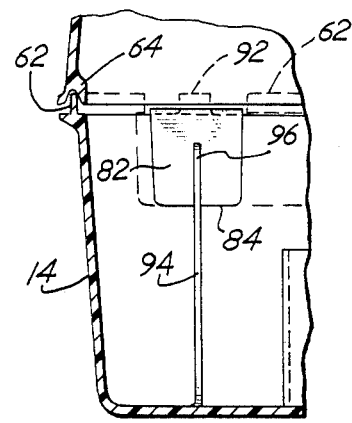

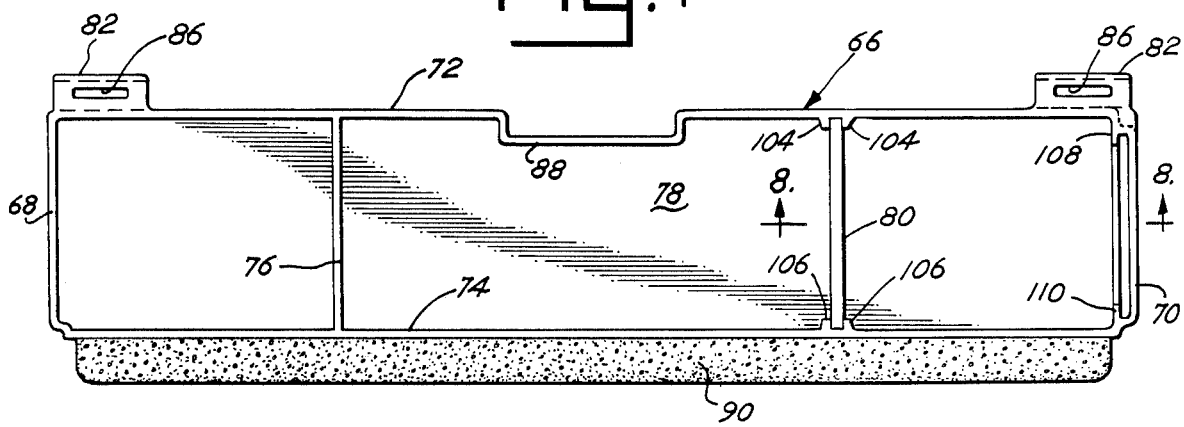
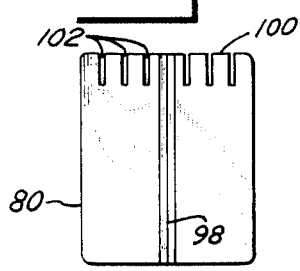
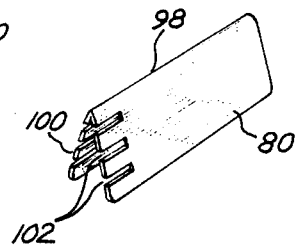
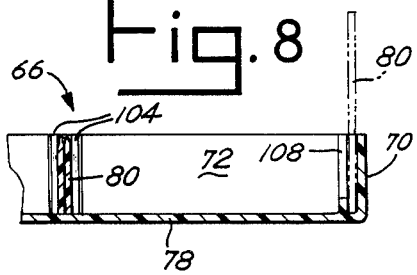
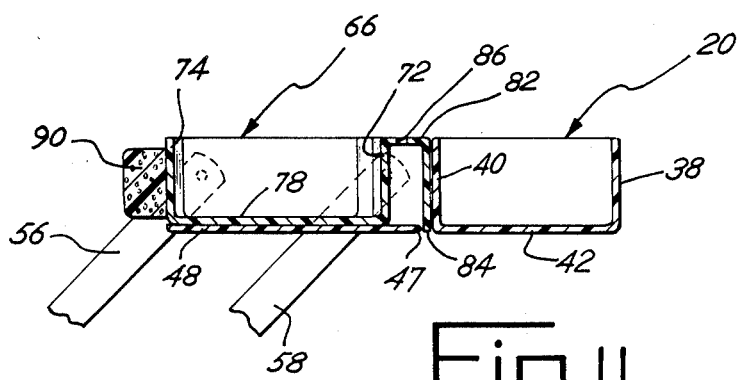

TACKLE BOX

BACKGROUND OF THE INVENTION

The present invention relates to fishing tackle boxes or containers adapted for use by fishermen to store and transport their tackle, bait, fishing accessories, and other equipment, and more particularly relates to molded plastic fishing tackle boxes. Such boxes or containers could, of course, also be used by hobbyists, handymen, workmen and others to store and transport their tools, equipment and the like.

Molded plastic tackle boxes of a variety of different structures and designs have been known and used in the past. Generally, they have included a molded plastic bottom part and a molded plastic lid. The bottom part includes integral side walls, end walls and a bottom wall and an open top which permits facile access to the interior of the bottom part. A hinge or hinges connect the lid with one of the side walls of the bottom part. The lid is adapted to be moved between a closed position wherein the lid overlies and closes the upper, open end of the bottom part and a open position.

In the past, tackle boxes have also included one or more movable molded plastic storage trays that are linked together and to the bottom part. These trays often include integral, internal walls that divide the interior of the trays into separate storage compartments. When the tackle box is closed, the trays are closely disposed, one on top of the other, within the interior of the box. When the box is opened, the trays may be moved upwardly and laterally with respect to each other and with respect to the bottom part so that tackle, baits, fishing accessories and other equipment being stored in the trays and in the bottom part are readily accessible to the fisherman.

Prior fishing tackle boxes have also included plastic polyfoam strips that may be used to secure jigs, poppers, hooks and other lures. Such boxes have sometimes accommodated removable racks for holding baits, tackle, fishing accessories and other equipment. These racks were adapted to be secured to the side of a boat, dock or the like by screws or similar fasteners.

A latch or latches have often been used to maintain the lid in its closed position. These latches are often mounted on the other side wall of the bottom part of the prior box.

With the prior tackle boxes, a fisherman had the choice of either leaving the box open while he was fishing or he had to open the box each time he wanted to gain access to the items of tackle, baits, fishing accessories or other equipment being stored in the box. Leaving the tackle box opened presented a risk. The box could be tipped over, and its contents spilled, when bumped or when the fisherman's boat rocked. Water or other causal objects might get into the box. Having to open the box frequently was, however, bothersome and awkward particularly when the box was in a boat in rough weather. Another alternative was to take items of tackle, baits, accessories and equipment needed for day's fishing out of the box at the beginning of the day and store them on the boat deck, racks, the dock, or the ground. This risked losing the removed items or having them stepped on during the course of the day.

Thus it has long been recognized in the art that it would be advantageous to have a fishing tackle box which would permit the temporary and safe storage of and the ease of access to selected items of tackle, bait, fishing accessories or other equipment outside the box while the box is closed. In this regard, see U.S. Pat. No. 1,497,377 issued to P. G. Lucas, Jr. on June 10, 1924; U.S. Pat. No. 3,639,021 issued Feb. 1, 1972 to Willard E. Fee; U.S. Pat. No. 4,353,182 issued Oct. 12, 1982 to Ronald J. Junkas, et al.; and U.S. Pat. No. 4,500,059 issued on Feb. 9, 1985 to John L. Papizan. To applicant's knowledge, none of the novel structures shown in the aforementioned patents have been embodied in commercially available tackle boxes.

SUMMARY OF THE INVENTION

In principal aspects, the present invention is directed to a molded plastic tackle box having a selectively removable, novel storage deck adapted to temporarily and safely hold a limited number of items of tackle, bait, fishing accessories and other equipment outside of the box. The storage deck of the present invention may be disposed in and mounted on the top storage tray of the box during normal use and transportation of the box. During the time the fisherman - owner of the box is fishing, the storage deck may, however, be removed from the tray and mounted on the side wall of the bottom part of the box. When so mounted, the storage lid of the box may be closed so as to prevent rain water and other causal objects from getting into the box and to preclude the spillage of the contents of the box if it happens to be bumped or tipped over. The fisherman thus has ready access to the items of tackle, baits, fishing accessories and other equipment that he believes he will need for the day's fishing while his other tackle, baits, fishing accessories and equipment remain safely stored inside the box.

Consequently, it is a primary object of the present invention to provide an improved molded plastic fishing tackle box adapted for use by fishermen, hobbyists, handymen, workmen, and the like. A related object is to provide an improved molded plastic fishing tackle box of the type described which permits fishermen to temporarily store selected items of tackle, baits, fishing accessories and other equipment on but outside of the closed tackle box while they are fishing.

Another object of the present invention is to provide an improved fishing tackle box having a plurality of interlinked, movable storage trays where the top tray includes a selectively removable storage deck that may be mounted on and supported by the top tray or alternatively may be removed from the top tray and mounted on the side wall of the bottom part of the box so as to provide ready access to items stored in the deck even when the lid of the box is closed. A related object is to provide an improved storage deck including means for mounting the storage deck on the side wall of the fishing box so that the plane of the storage deck will extend outwardly from the side wall in a direction substantially perpendicular to the plane of the side wall and so that the lid of the box may be moved between its open and closed position while the storage deck is mounted on the side wall of the box. A still further related object of the present invention is to provide a plastic polyfoam strip on the front side of the storage deck (that is, on the side away from the side wall of the bottom part of the tackle box) where this strip may be used to secure jigs, poppers, hooks and other lures.

Still another object of the present invention is to provide an improved molded plastic fishing tackle box having at least one storage compartment defining wall that is readily removable so that the size of the storage compartments in the box may be varied. A related object is to provide a selectively movable wall which when disposed in one position within the box, defines storage compartments in the box and when disposed in another position, serves as a rack for hanging baits.

These and other objects, advantages and features of the present invention will be set forth in the detailed description of the preferred embodiment of the present invention which follows.

BRIEF DESCRIPTION OF THE DRAWINGS

In the detailed description of the preferred embodiment, reference will be made to the drawings comprised of the following Figures:

FIG. 1 is a front perspective view of an improved tackle box of the present invention wherein the box is shown in its open position with the storage trays being shown above and spaced laterally from each other so that ready access can be had to the items stored in the trays and in the bottom part of the box and wherein the novel storage deck is shown nested on the top tray; and FIG. 2 is a partial, exploded perspective view of the top tray of the tackle box of FIG. 1 and the storage deck with the storage deck being shown in an un-nested position; and FIG. 3 is a partial, front perspective view showing the storage deck mounted on the front side of the bottom part of the box of FIG. 1; and FIG. 4 is a front perspective view, generally similar to FIG. 1, showing the storage deck mounted on the front side of the tackle box and the lid of the box in its closed position; and FIG. 5 is an enlarged, cross-sectional view taken along the line 5—5 in FIG. 4; and FIG. 6 is a partial cross-sectional view taken along the line 6—6 in FIG. 5; and FIG. 7 is a top plan view of the novel storage deck of the present invention; and FIG. 8 is a partial, cross-sectional view taken along the line 8—8 in FIG. 7; and FIG. 9 is a front, plan view of a movable dividing wall used with the storage deck to divide the deck into storage compartments, with the wall being shown as it is when mounted to provide a rack for hanging baits; and FIG. 10 is a front perspective view of the dividing wall of FIG. 9 shown partially folded along its central, longitudinal axis; and FIG. 11 is a partial, cross-sectional view taken along the line 11—11 in FIG. 1.

DESCRIPTION OF THE PREFERRED EMBODIMENT

Referring now to FIGS. 1 and 4, an improved tackle box of the present invention is shown generally at 2. Preferably the box is comprised of molded plastic component parts made by conventional injection molding processes. More particularly, the box 2 comprises a molded plastic bottom part 4 and a molded plastic lid 6. The bottom part 4 includes integral rear and front side walls 8 and 10, end walls 12 and 14, and a bottom wall 16. The upper end of the bottom part 2 is open so as to permit facile access to items stored in the interior of the bottom part.

A conventional hinge, shown generally at 18, connects the rear portion of the lid 6 to the rear side wall 8 of the bottom part 4. The lid is movable between an open position, shown generally in FIG. 1, and a closed position, shown generally in FIG. 4. When the lid is open, access can be had to the interior of the bottom part 4. Similarly when the lid is closed, it covers the upper end of the bottom part 2 and prevents access to the interior of the bottom part.

In the tackle box 2, three molded plastic storage trays, namely, a top tray 20, a middle tray 22 and a bottom tray 24, are mounted on the box 2 in a conventional manner as described below. The middle and bottom trays 22 and 24 each have integral end walls 26, side walls 28, a generally flat bottom wall 30, and internal divider walls 32. These walls serve to define a plurality of compartments in the trays for the storage of a variety of items of tackle, baits, fishing accessories and other equipment. Each of the trays 22 and 24 has an open top which permits access to items stored in the storage compartments of the tray. The overall length and width of the trays 22 and 24 are substantially equal.

The top tray 20, as best illustrated in FIGS. 1 and 2, also includes integral end walls 34 and 36, internal divider walls 37, side rear and front walls 38 and 40, and a generally flat bottom wall 42. These walls define a plurality of storage compartments in the tray. The upper end of the tray 20 is open so that access may be had to these storage compartments.

The front side wall 40 of the tray 20 includes a central, outwardly (or forwardly) projecting offset 44 and inwardly (or rearwardly) projecting insets 46 adjacent to each of its ends. For reasons discussed below, generally rectangular, transverse apertures 47 are formed in the bottom wall 42 in the insets 46. The bottom wall 42 extends forwardly beyond the front side wall 40 so as to form a projecting ledge 48. Similarly, the end walls 34 and 36 extend forwardly beyond the front side wall 40. The ledge 48 continues along and is adjacent to the extended end walls 34 and 36. The distal or front ends 50 of the extended end walls 34 and 36 are curved, at an angle of approximately 90 degrees, with respect to the longitudinal axes of the end walls so that these ends face each other. These distal ends 50 serve as retaining flanges as hereinafter described.

Referring now again to FIGS. 1-3, the trays 20, 22, and 24 are linked together by a conventional linkage system. More specifically, a first pair of links 52 extend between and interconnect the end walls 12 and 14 of the bottom part 4 and the front portions of the end walls 26 of the bottom tray 24. A second pair of links 54 extend between and interconnect the end walls 12 and 14 and the front portions of the end walls 26 of the middle tray 22. A third pair of links 56 extend between and interconnect the rear portions of the end walls 26 of the middle tray 22 and the front portions of the extended end walls 34 and 36 of the top tray 20. A fourth pair of links 58 extend between and interconnect the rear portions of the end walls 26 of the middle tray 22 and the middle portions of the end walls 34 and 36 of the top tray 20. Conventional rivets or other similar attachment means are used to attach the ends of the links 52, 54, 56 and 58 to the end walls so that the ends of the links may pivot relative to the end walls of the trays.

The linkage system (that is, the links 52, 54, 56, and 58) permits the trays 20, 22, and 24 to be selectively moved between: an open position, such as shown in FIG. 1, where the trays are spaced above and laterally from each other so that ready access may be had to the tackle, baits, fishing accessories and other equipment in the storage compartments in the trays 20, 22 and 24; and a stacked position where the trays are positioned one directly above the other and are aligned directly above the interior space of the bottom part 4. When in their stacked position, the open upper end of the bottom tray 24 is closely adjacent to the bottom wall 30 of the middle tray 22, and the open upper end of the middle tray 22 is closely adjacent to the bottom wall 42 of the top tray. The lid 6 may be moved to its closed position when the trays are in their stacked position, and in that position, the lid covers the trays.

A conventional latch, shown generally at 60, is mounted on the front side wall 10 adjacent to its upper edge and midway between the end walls 12 and 14 of the bottom part 4. It is adapted to cooperate with a projection, not shown, that is integrally molded on the central, front part of the lid 6, to retain the lid in its closed position.

A conventional, generally "U" shaped handle 61 is attached, at its ends, to the top of the lid 6, as illustrated in FIG. 4. This handle may be used for carrying the box 2 when the lid 6 is secured in its closed position by the latch 60.

As best seen in FIGS. 5 and 6, the upper edges of the side walls 8 and 10 and end walls 12 and 14 of the bottom part 4 include an upwardly projecting rim 62. The cooperating edges of the walls of the lid 6 include a groove 64. The rim 62 fits within the groove 64 when the lid is closed. The rim and groove functions as a tongue and groove arrangement and serves to prevent or minimize the ingress of rain water and other causal water into the interior of the box when the lid is in its closed position.

Referring now to FIGS. 2 and 7, a storage deck, which is one of the principal novel features of the present invention, is shown generally at 66. This deck is preferably primarily molded from plastic material by a conventional injection molding process. It includes integral end walls 68 and 70, rear and front side walls 72 and 74, a dividing wall 76, and a bottom wall 78. The deck 66 also includes a removable dividing wall 80. These walls serve to divide the interior of the deck into separate storage compartments. The upper end of the deck is open. Access to items stored in the storage compartments of the deck may be had through its open upper end.

Two identical hooks 82 are secured to the side wall 72 of the deck 66 adjacent to the end walls 68 and 70. These hooks are generally L-shaped. Each has a first portion that projects outwardly (or rearwardly) from the upper end of the side wall 72 and a second portion that projects downwardly so that the distal ends 84 of the hooks 82 lie just below the plane of the bottom wall 78. The first portions of the hooks 82 are generally parallel to the bottom wall 78 while the second portions are generally parallel to the side wall 72. A generally rectangular, transverse aperture 86 is formed in the section portions of the hooks 82. The width of the hooks 82, from side to side, is slightly less than the width of the insets 46 in the side wall 40 of the top tray 20.

The central part of the side wall 72 include an inwardly (or rearwardly) projecting offset 88 which is slightly larger in dimensions than the offset projection 48 in the side wall 38 of the top tray 20.

A strip of conventional polyfoam plastic material 90 is secured to the outside of the surface of the front side wall 74 of the deck 66 by a suitable, conventional adhesive. The strip 90 extends almost completely between the end walls 68 and 70 with only small spaces between the ends of the strip and the intersection of the end walls and the side walls 72 and 74. The strip is adapted to receive the pointed ends of hooks, such as the hooks used on jigs, poppers, and other lures, so that these hooks may be mounted on the strip. In other words, the strip serves as a place where a fisherman can safely and readily store hooks.

As noted above and as best shown in FIGS. 1 and 2, the deck 66 is adapted to be mounted on and supported by the upper tray 20. When the deck 66 is so nested, the hooks 82 fit within the insets 46 in the side wall 40 of the top tray 20. The distal ends 84 of the hooks 82 are disposed within the apertures 47 formed in the insets 46. Part of the bottom wall 78 rests on the ledge 48. The side wall 72 abuts the side wall 40, with the offset 44 fitting within the offset 88. The dimension of the deck 66, from front to rear, is such that the distal ends 50 of the extended end walls 34 and 36 of the tray 20 abut the front side wall 74 of the deck, adjacent to the intersection of that side wall 74 and the end walls 68 and 70. The end walls 68 and 70 of the deck 66 also abut the extended end walls 34 and 36 of the top tray 20. The combined overall width and length of the tray 20 and nested deck 66 is substantially equal to that of the trays 22 and 26.

As best shown in FIGS. 3-6, the deck 66 may be readily moved from its nested position on top tray 20 by grasping it, adjacent its front wall 74, and lifting it off of the tray 20. The deck 66 may then be mounted on the front side wall 10 of the bottom part 2. As best shown in FIGS. 4 and 5, when the deck is mounted on the side wall 10, the plane of its bottom wall 76 is substantially perpendicular to the plane of the side wall 10. To so mount the deck, two upstanding tabs 92 are formed in the rim 62 on the side wall 10. These tabs are actually part of the rim itself and are formed by cutting away portions of the rim at each side of the tabs. In practice, the tabs 92 can be formed in the molding of the bottom part 2. The cut away portions of the rim 62 and the tabs 92 are sized and located so that the hooks 82 rest on the cut away portions while the tabs project through the apertures 86. Additionally, the distance between the plane of the distal ends 84 of the hooks 82 and the side wall 72 of the deck (that is, the length of the first portions of the hooks 82) is selected so as to be substantially equal to the thickness of the side wall 10.

A pair of integral, upstanding ribs 94 are formed on the inner surface of the front side wall 10 of the bottom part 4. These ribs are aligned with the tabs 92. Their upper ends 96 extend close to the top edge of the side wall 10. Each of these upper ends 96 is cut away adjacent to the side wall 10. The distal ends 84 of the hooks 82 are adapted to fit within these cut away portions of the upper ends 96 so that as best shown in FIGS. 5 and 6, the ribs assist in supporting the deck 66 on the side walls.

The offset 48 in the side wall 72 of the deck 66 is of sufficient size to accommodate the latch 60 when the deck is mounted on the side wall 10. The latch 60 may be positioned so that it can be used to hold the lid 6 in its closed position, thereby permitting the box 2 to be carried, when the storage deck 66 is mounted on the side wall 10. Additionally, the thickness and width of the hooks and the widths of the cut away portions, adjacent to the tabs 92, are selected so as to minimize the leakage of rain water or causal water into the interior of the box 2 when the lid 6 is closed such as shown in FIGS. 4-6.

Referring again to the dividing wall 80 of the deck 66, this wall is adapted to be selectively moved from its position, as shown in FIG. 7, where it serves to divide the interior of the deck 66 into storage compartments. The wall 80 is molded from plastic material and has a reduced or "weakened" portion along its central longitudinal axis 98. The wall 80 may be folded, upon itself, about its axis 98 as illustrated in FIG. 10. One end of 100 of the wall 80 has a plurality of slots 102 which are adapted to receive the hooks of baits. The length of the wall 80, from end to end, is substantially equal to the distance between the side walls 72 and 74 adjacent the end wall 70.

Two pairs of oppositely facing projections 104 and 106 are formed on the insides of the side walls 72 and 74. These pairs of projections 104 and 106 define a first set of facing grooves therebetween. These grooves have a width that is substantially equal to the thickness of the wall 80, when it is folded upon itself about its axis 98, so that the ends of the wall may be received within the grooves as best shown in FIGS. 1, 2 and 7.

Adjacent to the end wall 70, the side walls 72 and 74 of the deck are slightly necked down, and a pair of oppositely facing projections 108 and 110 are formed at the junctures of the side walls and end wall 70. These projections and the end wall define a second set of facing grooves whose width is substantially equal to the thickness of the wall 80 when it is unfolded. The distance between this second set of grooves is substantially equal to the width of the unfolded wall 80. Accordingly, the lower end of the wall 80 may be received and retained within these grooves 80 when the wall 80 is in its unfolded position.

The wall 80 can thus be used, in its folded position, to divide the interior of the deck 66 into separate compartments. Selectively, a fisherman may lift the wall from the first set of grooves, defined by the projections 104 and 106, unfold the wall, and place its lower end (that is, the end opposite to the end 100) into the second set of grooves adjacent the end wall 70. The height of the wall 80 is such that its end 100 projects above the upper ends of the walls 68, 70, 72 and 74 of the deck when the wall 80 is mounted adjacent to the end wall 70. A fisherman can then hang baits from its upper end 100. The wall 80 is normally disposed in the former position, shown in the solid lines in FIG. 8, when the deck 66 is mounted on and supported by the upper tray 20 and is disposed in its former or bait receiving position, as shown in phantom lines in FIG. 8, when the deck 66 is mounted on the front side wall 10 of the bottom part 4.

In conclusion and as will be apparent to those having ordinary skill in this art, various changes and modifications could be made in the above described preferred embodiment of the present invention without departing from the spirit or central characteristics of the invention. For example, another removable dividing wall, such as the dividing wall 80, could be used in place of the wall 76 so that fishermen might selectively have hanging bait racks at both ends of the deck. Similarly, such removable, storage compartment defining walls could also be utilized in a storage tray, particularly the top tray 20, or in other parts of the box so that the fisherman might selectively have hanging racks at the end or ends of the trays or the other parts of the box. Additionally, the offset 88 of the side wall 72 of the deck 66 could be enlarged so as to accommodate other latch designs including a latch which could be both locked or unlocked while the deck 66 was mounted on the side wall 10.

I claim:

1. An improved fishing tackle box having: a molded plastic bottom part having integral facing side walls, facing end walls, a bottom wall and an open, upper end that permits access to the interior of the bottom part, with the upper edge of one of the side walls being cut away so as to define at least one upstanding projection; a molded plastic lid; means for permitting the lid to be hinged to the other of the side walls of the bottom part and to be selectively moved between a box-closed position wherein the lid overlies and closes the upper end of the bottom part and together with the bottom part defines an interior storage space within the box and a box-opened position wherein the lid is disposed so that access may be had to the interior space of the bottom part; a first tray mounted on the bottom part and having side walls, end walls, a bottom wall, and an open upper end, with the walls defining at least one storage compartment accessible through its open upper end and a deck receiving portion; a second tray also mounted on the bottom part and having side walls, end walls, a bottom wall, and an open upper end, with the walls defining at least one storage compartment accessible through its open upper end; means for linking the first and second trays together and to the bottom part; means for permitting the first and second trays to be selectively moved, relative to the bottom part, between a first position where the trays are disposed within the interior storage space of the box and where the bottom of the first tray overlies and is closely adjacent to the open upper end of the second tray and a second position where the first and second trays are spaced laterally from each other so that ready access may be had to the storage compartments of both trays; a latch selectively movable between a latched position wherein the lid is latched to the bottom part and an unlatched position; and a molded plastic, portable storage deck having a bottom wall, facing side walls, facing end walls and an open, upper end, with these walls defining at least one storage compartment accessible through the open upper end of the storage deck; the storage deck being of a size so as to fit within the interior storage space of the box and being selectively movable between a first position wherein it is removably mounted on the deck receiving portion of the first tray so that storage deck is within the interior storage space of the box when the lid is in its box-closed position and so that the storage compartment of the storage deck is accessible when the lid is in its box-open position and a second position wherein the storage deck is removably mounted on the exterior of the other side wall of the bottom part and without the interior of the box so that the storage compartment of the storage deck is accessible when the lid is in both its box-closed position and its box-open position, the storage deck also having at least one hook that extends outwardly and downwardly from one of its side walls, with the hook fitting over the upper edge of the one side wall of the bottom part so that the distal end of the hook extends down, adjacent to the inside surface of the one side wall of the bottom part and so that the distal end of the hook fits into a upwardly facing recess on the inner face of the side wall of the bottom part when the storage deck is in its second position, and with an aperture being formed in the hook for receiving the projection on the one side wall of the bottom part when the storage deck is in its second position.

2. The improved fishing tackle box described in claim 1 wherein the storage deck receiving portion of the first tray includes means for holding the storage deck on the deck receiving portion; and wherein the holding means includes at least one aperture in the bottom of the first tray, the aperture being adapted to receive the distal end of the hook when the storage deck is mounted on the first tray.

3. The improved fishing tackle box described in claim 2 wherein when the storage deck is in its second position, the plane of its bottom wall is substantially perpendicular to the plane of the other side wall of the bottom part and extends outwardly from the other side wall of the bottom part.

4. The fishing tackle box described in claim 3 wherein two of the walls defining the storage compartment of the storage deck are spaced apart a predetermined distance and have a first set of opposed, facing pairs of projections formed thereon, with each pair of projections defining a first set of opposed facing grooves therebetween; wherein a second set of opposed facing projections are formed on the side walls adjacent to one end wall of the storage deck, with the second set of projections defining a second set of opposed facing grooves; wherein the width of the second set of grooves being approximately one-half the width of the first set of grooves; wherein a movable wall member is adapted to be disposed and supported within the first and second sets of grooves, the wall member having a length and width substantially equal to the predetermined distance and greater than the height of the side walls adjacent to the one end wall, having a thickness substantially equal to the width of second set of grooves and being foldable upon itself along its central, longitudinal axis; wherein the wall member is movable between a first position where the wall member is folded upon itself and its ends are disposed within the first set of grooves so that the wall member serves to divide the storage compartment of the storage deck and a second position where the sides of the unfolded wall member are disposed within the second set of grooves so that an end of the wall member projects above the two walls of the storage deck and are adapted to form a rack for hanging baits.

5. The box described in claim 4 wherein a strip is secured to the outside of the other side wall of the storage deck and is adapted to receive and hold fishing hooks; and wherein the length and width of the second tray are substantially equal to the length and width of the first tray and the storage deck when the deck is in its first position.

6. An improved fishing tackle box comprising: a molded plastic bottom part having integral facing side walls, facing end walls, a bottom wall and an open, upper end that permits access to the interior of the bottom part, with the upper edge of one of the side walls being cut away so as to define at least one upstanding projection; a first tray that is mounted on the bottom part and that has side walls, end walls, a bottom wall, and an open upper end, with the walls of the first tray defining at least one storage compartment accessible through its open upper end and a deck receiving portion; a molded plastic lid; means for permitting the lid to be hinged to the other of the side walls of the bottom part and to be selectively moved between a box-closed position wherein the lid overlies and closes the upper end of the bottom part and together with the bottom part defines an interior storage space within the box and a box-opened position wherein the lid is disposed so that access may be had to the interior space of the bottom part; and a latch selectively movable between a latched position wherein the lid is latched to the bottom part and an unlatched position; and a molded plastic, portable storage deck having a bottom wall, facing side walls, facing end walls and an open, upper end, with these walls defining at least one storage compartment accessible through the open upper end of the storage deck; the storage deck being of a size so as to fit within the interior storage space of the box and being selectively movable between a first position wherein it is removably disposed on the deck receiving portion of the first tray so that it is within the interior storage space of the box when the lid is in its box-closed position and so that the storage compartment of the storage deck is accessible when the lid is in its box-open position and a second position wherein the storage deck is removable mounted on the exterior of the other side wall of the bottom part and without the interior of the box so that the storage compartment of the storage deck is accessible when the lid is in both its box-closed position and its box-open position, the storage deck also having at least one hook that extends outwardly and downwardly from one of its side walls, with the hook fitting over the upper edge of the one side wall of the bottom part so that the distal end of the hook extends down, adjacent to the inside surface of the one side wall of the bottom part and so that the distal end of the hook fits into a upwardly facing recess on the inner face of the side wall of the bottom part when the storage deck is in its second position, and with an aperture being formed in the hook for receiving the projection on the one side wall of the bottom part when the storage deck is in its second position.

7. An improved fishing tackle box comprising: a molded plastic bottom part having integral facing side walls, facing end walls, a bottom wall and an open, upper end that permits access to the interior of the bottom part, with the upper edge of one of the side walls being cut away so as to define at least one upstanding projection; a first tray that is mounted on the bottom part and that has side walls, end walls, a bottom wall, and an open upper end, with the walls of the first tray defining at least one storage compartment accessible through its open upper end and a deck receiving portion; a molded plastic lid; means for permitting the lid to be hinged to the other of the side walls of the bottom part and to be selectively moved between a box-closed position wherein the lid overlies and closes the upper end of the bottom part and together with the bottom part defines an interior storage space within the box and a box-opened position wherein the lid is disposed so that access may be had to the interior space of the bottom part; and a latch selectively movable between a latched position wherein the lid is latched to the bottom part and an unlatched position; and a molded plastic, portable storage deck having a bottom wall, facing side walls, facing end walls and an open, upper end, with these walls defining at least one storage compartment accessible through the open upper end of the storage deck; the storage deck being of a size so as to fit within the interior storage space of the box and being selectively movable between a first position wherein it is removably disposed on the deck receiving portion of the first tray so that it is within the interior storage space of the box when the lid is in its box-closed position and so that the storage compartment of the storage deck is accessible when the lid is in its box-open position and a second position wherein the storage deck is removably mounted on the exterior of the other side wall of the bottom part and without the interior of the box so that the storage compartment of the storage deck is accessible when the lid is in both its box-closed position and its box-open position, the storage deck also having at least one hook that extends outwardly and downwardly from one of its side walls, and the bottom wall of the first tray having at least one aperture adapted to receive the distal end of the hook when the storage deck is disposed on the first tray.

8. The improved fishing tackle box described in claim 6 wherein the storage deck receiving portion of the first tray includes means for holding the storage deck on the deck receiving portion; and wherein the holding means includes at least one aperture in the bottom wall of the first tray, the aperture being adapted to receive the distal end of the hook when the storage deck is mounted on the first tray.

9. An improved fishing tackle box comprising: a molded plastic bottom part having integral facing side walls, facing end walls, a bottom wall and an open, upper end that permits access to the interior of the bottom part; a molded plastic lid; means for permitting the lid to be hinged to one of the side walls of the bottom part and to be selectively moved between a box-closed position wherein the lid overlies and closes the upper end of the bottom part and together with the bottom part defines an interior storage space within the box and a box-opened position wherein the lid is disposed so that access may be had to the interior space of the bottom part; and a latch selectively movable between a latched position wherein the lid is latched to the bottom part and an unlatched position; and a molded plastic, portable storage deck having a bottom wall, facing side walls, facing end walls and an open, upper end, with these walls defining at least one storage compartment accessible through the open upper end of the storage deck; the storage deck being of a size so as to fit within the interior storage space of the box and being selectively movable between a first position wherein it is removably mounted on the box so that it is within the interior storage space of the box when the lid is in its box-closed position and so that the storage compartment of the storage deck is accessible when the lid is in its box-open position and a second position wherein the storage deck is removably mounted on the exterior of the other side wall of the bottom part and without the interior of the box so that the storage compartment of the storage deck is accessible when the lid is in both its box-closed position and its box-open position; with two of the walls defining the storage compartment of the storage deck being spaced apart a predetermined distance and having a first set of opposed, facing pairs of projections formed thereon, and with each pair of projections defining a first set of opposed facing grooves therebetween; wherein a second set of opposed facing projections are formed on the side walls adjacent to one end wall of the storage deck, with the second set of projections defining a second set of opposed facing grooves; wherein the width of the second set of grooves being approximately one-half the width of the first set of grooves; wherein a movable wall member is adapted to be disposed within the first and second sets of grooves, the wall member having a length substantially equal to the predetermined distance and greater than the height of the side walls adjacent to the one end wall, having a thickness substantially equal to the width of second set of grooves and being foldable upon itself along its central, longitudinal axis; wherein the wall member is movable between a first position where the wall member is folded upon itself and its ends are disposed within the first set of grooves so that the wall member serves to divide the storage compartment of the storage deck and a second position where the sides of the unfolded wall member are disposed within the second set of grooves so that an end of the wall member projects above the walls of the storage deck and are adapted to form a rack for handing baits.

10. The improved fishing tackle box described in claim 9 wherein the latch is mounted on the bottom part adjacent to the upper edge of its other side wall; and wherein the one side wall of the storage deck includes an inwardly directed offset adapted to receive and accommodate the latch.

* * * * *